US012737172B2

(12) United States Patent
Udate et al.

(10) Patent No.: US 12,737,172 B2
(45) Date of Patent: Sep. 15, 2026

(54) UPDATE VERIFICATION METHOD, UPDATE VERIFICATION SYSTEM, AND NON-TRANSITORY COMPUTER READABLE RECORDING MEDIUM

(71) Applicant: TOYOTA JIDOSHA KABUSHIKI KAISHA, Toyota (JP)

(72) Inventors: Masateru Udate, Edogawa-ku Tokyo-to (JP); Naoya Oka, Toyota (JP); Yuki Takahashi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 309 days.

(21) Appl. No.: 18/746,211

(22) Filed: Jun. 18, 2024

(65) Prior Publication Data

US 2024/0427591 A1 Dec. 26, 2024

(30) Foreign Application Priority Data

Jun. 22, 2023 (JP) ................................ 2023-102363

(51) Int. Cl.
*B60W 60/00* (2020.01)
*B60W 50/00* (2006.01)
(Continued)

(52) U.S. Cl.
CPC ............. *G06F 8/65* (2013.01); *B60W 60/001* (2020.02)

(58) Field of Classification Search
CPC ......... G06F 8/65; G06N 20/00; B60W 60/001
See application file for complete search history.

(56) References Cited

U.S. PATENT DOCUMENTS

2019/0318257 A1* 10/2019 Gould .................... G06N 20/00
2020/0125042 A1 4/2020 Oyagi et al.
(Continued)

FOREIGN PATENT DOCUMENTS

CN 106996793 B * 11/2020 ......... G01C 21/3815
JP 2019-139734 A 8/2019
(Continued)

OTHER PUBLICATIONS

Frolich, Laura et al., "Deploy new ML model only if better than currently deployed model," Medium, webpage <https://laurafrolich.medium.com/deploy-new-ml-model-only-if-better-than-currently-deployed-model-9ed2f66be203>, 12 pages, Jan. 5, 2022.

*Primary Examiner* — S. Sough
*Assistant Examiner* — Mohammad H Kabir
(74) *Attorney, Agent, or Firm* — Dinsmore & Shohl LLP

(57) ABSTRACT

An update verification method acquires a first verification number and a second verification number. The first verification number is either a number of objects around a vehicle recognized by a machine learning model after upgrade, or a number of driving decisions in a travel plan generated by the machine learning model after the upgrade. The second verification number is either a number of objects around the vehicle recognized by the machine learning model before the upgrade, or a number of driving decisions in the travel plan generated by the machine learning model before the upgrade. Then, the update verification method verifies whether an update of a control apparatus is normal by comparing the first verification number with the second verification number.

4 Claims, 6 Drawing Sheets

(51) Int. Cl.
*B60W 50/08* (2020.01)
*G06F 8/65* (2018.01)

(56) References Cited

U.S. PATENT DOCUMENTS

| | | | | |
|---|---|---|---|---|
| 2022/0284092 | A1 | 9/2022 | Ito et al. | |
| 2023/0084316 | A1* | 3/2023 | Levandowski | B60W 30/12 701/28 |
| 2023/0288223 | A1* | 9/2023 | Shekar | G01C 21/30 |
| 2025/0085955 | A1* | 3/2025 | Miroshkin | G06F 8/65 |
| 2025/0206355 | A1* | 6/2025 | Oba | B60W 50/08 |

FOREIGN PATENT DOCUMENTS

| | | | |
|---|---|---|---|
| JP | 2020-067762 | A | 4/2020 |
| JP | 2021-089632 | A | 6/2021 |
| WO | 2016/157278 | A1 | 10/2016 |

* cited by examiner

UPDATE VERIFICATION METHOD, UPDATE VERIFICATION SYSTEM, AND NON-TRANSITORY COMPUTER READABLE RECORDING MEDIUM

CROSS-REFERENCE TO RELATED APPLICATION

The present disclosure claims priority to Japanese Patent Application No. 2023-102363, filed on Jun. 22, 2023, the contents of which application are incorporated herein by reference in their entirety.

TECHNICAL FIELD

The present disclosure relates to a technique for verifying an update of a control apparatus of a vehicle. In particular, the present disclosure relates to a control apparatus that performs automated driving control of a vehicle by using a machine learning model.

BACKGROUND ART

In recent years, various techniques have been proposed to utilize a machine learning model as artificial intelligence (AI) in the field of vehicle control. For example, the following Patent Literature 1 is a document disclosing a technique for utilizing a machine learning model in the field of vehicle control. In addition, the following Patent Literatures 2 to 4 are documents showing the technical level of the present technical field.

LIST OF RELATED ART

Patent Literature 1: JP 2020067762 A
Patent Literature 2: JP 2019139734 A
Patent Literature 3: JP 2021089632 A
Patent Literature 4: WO 2016/157278 A1

SUMMARY

Among vehicle controls, automated driving control is expected to improve control performance by using a machine learning model in each of the recognition, determination, and operation functions. When a machine learning model is used, the machine learning model may be upgraded when updating a control apparatus that performs the automated driving control. It is considered that the upgraded machine learning model is distributed to each vehicle subject to the update after its performance is verified through offline verification and evaluation using an experimental vehicle.

However, in a machine learning model, the inference result may change greatly due to small changes in input. In addition, it is considered that the vehicles are different from each other in the state of the sensor or the like. Therefore, depending on the vehicle, the upgraded machine learning model may not function well, and the update may not be normal.

An object of the present disclosure is to provide a technique capable of identifying at an early stage that the update is not normal when a machine learning model is upgraded.

A first aspect of the present disclosure is directed to an update verification method for verifying, by a computer, an update of a control apparatus that performs automated driving control of a vehicle by using a machine learning model. The computer is configured to be able to access one or more storage devices that store log data regarding an inference result by the machine learning model. The update includes upgrade of the machine learning model. The machine learning model is configured to perform at least one of recognizing a surrounding situation of the vehicle or generating a travel plan for the automated driving control.

The update verification method includes that the computer executes:

- acquiring a first verification number, the first verification number being either a number of objects around the vehicle recognized during the predetermined period or the predetermined distance by the machine learning model after the upgrade, or a number of driving decisions in the travel plan generated during the predetermined period or the predetermined distance by the machine learning model after the upgrade;
- acquiring a second verification number with reference to the log data, the second verification number being either a number of objects around the vehicle recognized during the predetermined period or the predetermined distance by the machine learning model before the upgrade, or a number of driving decisions in the travel plan generated during the predetermined period or the predetermined distance by the machine learning model before the upgrade; and
- verifying whether the update is normal by comparing the first verification number with the second verification number.

A second aspect of the present disclosure is directed to an update verification system for verifying an update of a control apparatus that performs automated driving control of a vehicle by using a machine learning model. The update includes upgrade of the machine learning model. The machine learning model is configured to perform at least one of recognizing a surrounding situation of the vehicle or generating a travel plan for the automated driving control.

The update verification system comprises:

- one or more processors; and
- one or more storage devices storing log data regarding an inference result by the machine learning model.

The one or more processors are configured to execute:

- acquiring a first verification number, the first verification number being either a number of objects around the vehicle recognized during the predetermined period or the predetermined distance by the machine learning model after the upgrade, or a number of driving decisions in the travel plan generated during the predetermined period or the predetermined distance by the machine learning model after the upgrade;
- acquiring a second verification number with reference to the log data, the second verification number being either a number of objects around the vehicle recognized during the predetermined period or the predetermined distance by the machine learning model before the upgrade, or a number of driving decisions in the travel plan generated during the predetermined period or the predetermined distance by the machine learning model before the upgrade; and
- verifying whether the update is normal by comparing the first verification number with the second verification number.

A third aspect of the present disclosure is directed to an update verification program for causing a computer to execute verifying an update of a control apparatus that performs automated driving control of a vehicle by using a machine learning model. The update verification program, when executed by the computer, caused the computer to execute the update verification method according to the first aspect.

According to the present disclosure, it is possible to verify the update of the control apparatus without requiring special verification or additional verification. It is thus possible to identify at an early stage that the update is not normal.

DETAILED DESCRIPTION

1. Control Apparatus

The update verification method according to the present embodiment verifies an update of a control apparatus that performs automated driving control of a vehicle by using a machine learning model. Hereinafter, a control apparatus which is a target of the update verification method according to the present embodiment will be described.

Figure 1:
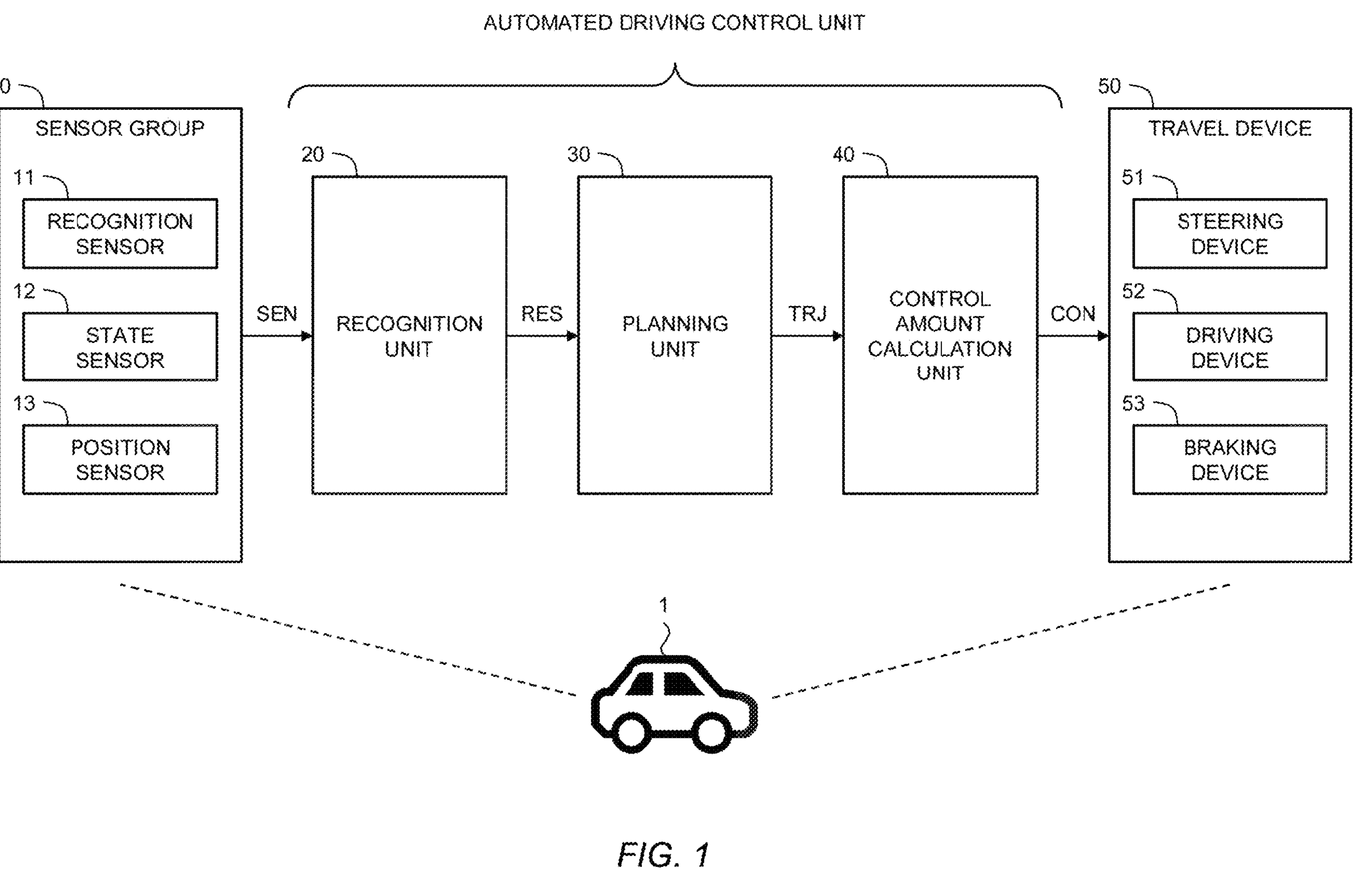
FIG. 1 is a diagram showing an example of a configuration related to automated driving control of a vehicle.

FIG. 1 is a diagram showing a configuration example related to automated driving control of a vehicle 1 performed by the control apparatus. The automated driving is to automatically perform at least one of steering, acceleration, and deceleration of the vehicle 1 without depending on a driving operation performed by an operator. The automated driving control is a concept including not only complete automated driving control but also risk avoidance control, lane keep assist control, and the like. The operator may be a driver on board the vehicle 1 or may be a remote operator who remotely operates the vehicle 1.

The vehicle 1 includes a sensor group 10, a recognition unit 20, a planning unit 30, a control amount calculation unit 40, and a travel device 50.

The sensor group 10 includes a recognition sensor 11 used for recognizing a situation around the vehicle 1. Examples of the recognition sensor 11 include a camera, a laser imaging detection and ranging (LIDAR), a radar, and the like. The sensor group 10 may further include a state sensor 12 that detects a state of the vehicle 1, a position sensor 13 that detects a position of the vehicle 1, and the like. Examples of the state sensor 12 include an acceleration sensor, a yaw rate sensor, and the like. As the position sensor 13, a global navigation satellite system (GNSS) sensor is exemplified.

Sensor detection information SEN is information acquired by the use of the sensor group 10. For example, the sensor detection information SEN includes an image captured (taken) by the camera. As another example, the sensor detection information SEN may include point group information acquired by the LIDAR. The sensor detection information SEN may include vehicle state information indicating the state of the vehicle 1. The sensor detection information SEN may include position information indicating the position of the vehicle 1.

The recognition unit 20 receives the sensor detection information SEN. The recognition unit 20 recognizes a situation around the vehicle 1 based on the information acquired by the recognition sensor 11. For example, the recognition unit 20 recognizes an object around the vehicle 1. Examples of the object include a pedestrian, another vehicle, a white line, a road structure, a fallen object, a traffic light, an intersection, a sign, and the like. Recognition result information RES indicates a result of recognition by the recognition unit 20. For example, the recognition result information RES includes object information indicating a relative position and a relative speed of the object with respect to the vehicle 1.

The planning unit (planner) 30 receives the recognition result information RES from the recognition unit 20. In addition, the planning unit 30 may receive the vehicle state information, the position information, and map information. The map information may be high-precision three-dimensional map information. The planning unit 30 generates a travel plan of the vehicle 1 based on the received information. The travel plan may be one for arriving at a destination set in advance. The travel plan may be one for avoiding a risk. As the travel plan, driving decisions such as maintaining a current travel lane, making a lane change, overtaking, making a right or left turn, steering, accelerating, decelerating, stopping, and the like are given. Further, the planning unit 30 generates a target trajectory TRJ required for the vehicle 1 to travel in accordance with the travel plan. The target trajectory TRJ includes a target position and a target velocity.

The control amount calculation unit 40 receives the target trajectory TRJ from the planning unit 30. The control amount calculation unit 40 calculates a control amount CON required for the vehicle 1 to follow the target trajectory TRJ. It can be also said that the control amount CON is a control amount required for reducing a deviation of the vehicle 1 from the target trajectory TRJ. The control amount CON includes at least one of a steering control amount, a driving control amount, and a braking control amount.

The travel device 50 includes a steering device 51, a driving device 52, and a braking device 53. The steering device 51 steers wheels of the vehicle 1. The driving device 52 is a power source that generates a driving force. Examples of the driving device 52 include an engine, an electric motor, and the like. The braking device 53 generates a braking force. The travel device 50 receives the control amount CON from the control amount calculation unit 40. The travel device 50 operates the steering device 51, the driving device 52, and the braking device 53 in accordance with the steering control amount, the driving control amount, and the braking control amount, respectively. Thus, the vehicle 1 travels so as to follow the target trajectory TRJ.

The recognition unit 20 includes at least one of a rule-based model and a machine learning model. The rule-based model performs the recognition process based on a predetermined rule group. Examples of the machine learning model include a neural network (NN), a support vector machine (SVM), a regression model, a decision tree model, and the like. The NN may be a convolutional neural network (CNN), a recurrent neural network (RNN), or a combination of CNN and RNN. The type of each layer, the number of layers, and the number of nodes in the NN are arbitrary. The machine learning model is generated in advance through machine learning. The recognition unit 20 performs the recognition process by inputting the sensor detection information SEN into the model.

Similarly, the planning unit 30 also includes at least one of a rule-based model and a machine learning model. The planning unit 30 performs the planning process by inputting the recognition result information RES into the model.

Similarly, the control amount calculation unit 40 also includes at least one of a rule-based model and a machine learning model. The control amount calculation unit 40 performs the control amount calculation process by inputting the target trajectory TRJ into the model.

Two or more of the recognition unit 20, the planning unit 30, and the control amount calculation unit 40 may have an integrated architecture. All of the recognition unit 20, the planning unit 30, and the control amount calculation unit 40 may have an integrated architecture (End-to-End architecture). For example, the recognition unit 20 and the planning unit 30 may have an integrated architecture that generates and outputs the target trajectory TRJ directly from the sensor detection information SEN. Even in the case of the integrated architecture, intermediate products such as the recognition result information RES and the target trajectory TRJ may be output. For example, in a case where the recognition unit 20 and the planning unit 30 have an integrated architecture based on a NN, the recognition result information RES may be an output from an intermediate layer of the NN.

The recognition unit 20, the planning unit 30, and the control amount calculation unit 40 constitute an "automated driving control unit" that controls the automated driving of the vehicle 1. In the present embodiment, at least one of the recognition unit 20 and the planning unit 30 includes a machine learning model. That is, the machine learning model performs at least one of recognition of the situation around the vehicle 1 and generation of the travel plan. When the machine learning model recognizes the situation around the vehicle 1, the inference result by the machine learning model is, for example, an object recognized on the image. Alternatively, the inference result is an object recognized on a spatial map around the vehicle 1. In addition, when the machine learning model generates a travel plan, the inference result by the machine learning model is, for example, driving decisions constituting the travel plan. The automated driving control unit performs automated driving control of the vehicle 1 by using the machine learning model.

Figure 2:
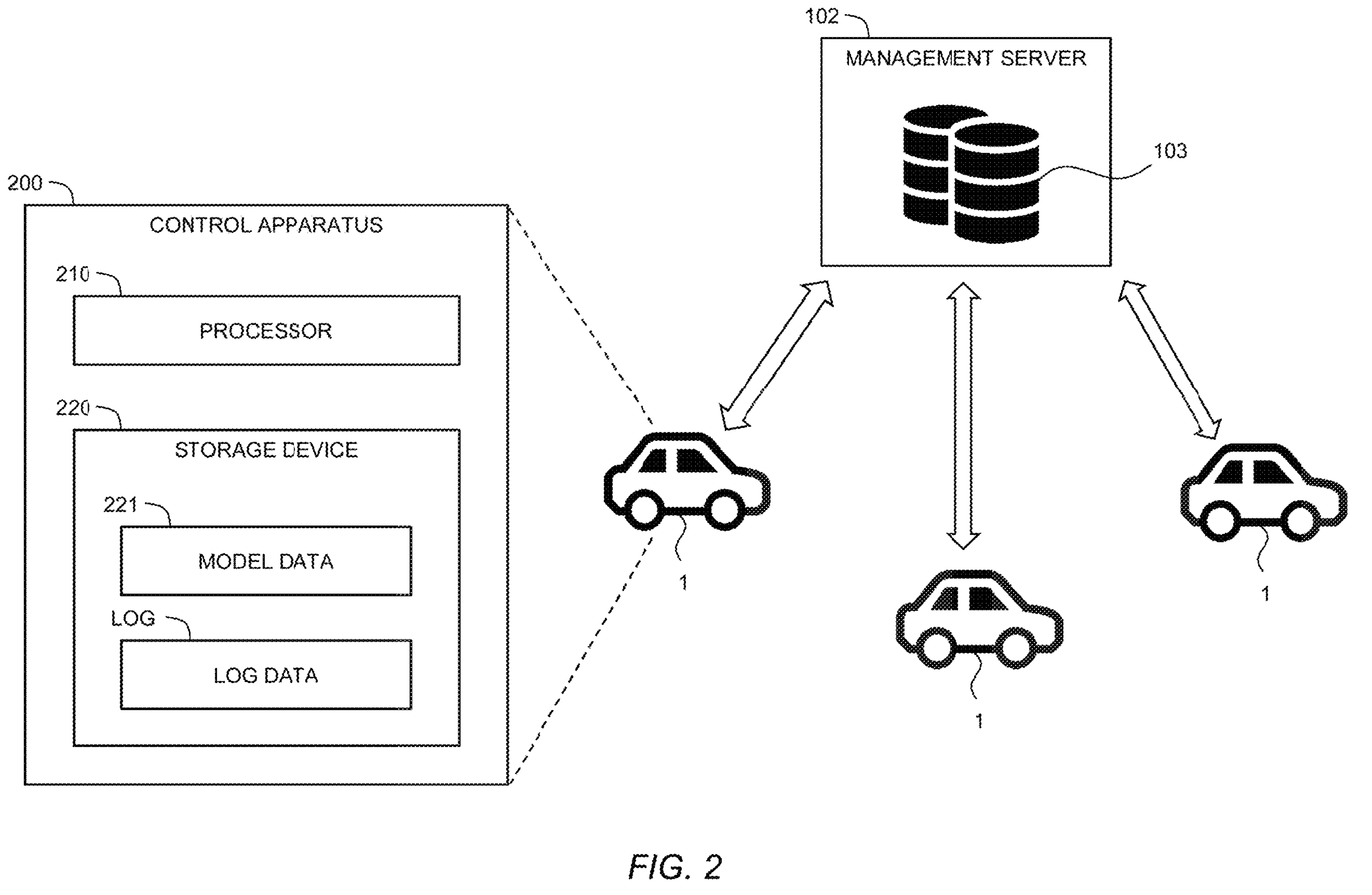
FIG. 2 is a diagram showing an example of a configuration of a control apparatus according to the present embodiment.

FIG. 2 is a diagram showing an example of a configuration of a control apparatus 200. The control apparatus 200 is mounted on the vehicle 1 and performs automated driving control of the vehicle 1. The control apparatus 200 has at least the function of the automated driving control unit described above. The control apparatus 200 may be configured to be able to communicate with the sensor group 10 and the travel device 50.

The control apparatus 200 includes one or more processors 210 (hereinafter, simply referred to as a processor 210 or processing circuitry) and one or more storage devices 220 (hereinafter, simply referred to as a storage device 220). The processor 210 executes various processes in accordance with a computer program. The computer program may be stored in the storage device 220. The storage device 220 stores various kinds of information. The recognition unit 20, the planning unit 30, and the control amount calculation unit 40 may be implemented by a single processor 210 or may be respectively implemented by separate processors 210.

The model data 221 is data of a model included in the recognition unit 20, the planning unit 30, and the control amount calculation unit 40. As described above, in the present embodiment, at least one of the recognition unit 20 and the planning unit 30 includes a machine learning model. The model data 221 is stored in the storage device 220 and used for automated driving control.

The control apparatus 200 is configured to be able to perform updating for the purpose of improving control performance, adding functions, and the like. For example, the control apparatus 200 is configured to acquire a computer program for update via a communication network and install the acquired computer program. Specifically, the update of the control apparatus 200 may include upgrade of the machine learning model. In this case, the control apparatus 200 acquires a machine learning model after the upgrade, and replaces the machine learning model included in the model data 221 with the acquired machine learning model.

While the automated driving control is being performed, the processor 210 collect log data LOG related to the automated driving control using the machine learning model. The processor 210 stores the log data LOG collected during the execution of the automated driving control in the storage device 220. The log data LOG may be a log of data with respect to a time change or may be a log of data with respect to the position of the vehicle 1.

The management server 102 is a database server that manages a database 103. The management server 102 can be considered as a memory that stores the database 103. The management server 102 communicates with one or more vehicles 1 via a communication network. In the present embodiment, during the execution of the automated driving control or after the completion of the automated driving control, the processor 210 of the vehicle 1 uploads a part of the log data LOG stored in the local storage device 220 to the management server 102. Specifically, the processor 210 is configured to upload at least the log data LOG regarding the inference result by the machine learning model to the management server 102. The log data LOG regarding the inference result by the machine learning model may include version information of the machine learning model when the log data LOG is collected.

The management server 102 acquires log data LOG uploaded from one or more vehicles 1. Then, the management server 102 manages the acquired log data LOG in the database 103. In the database 103, at least the log data LOG regarding the inference result by the machine learning model in each vehicle is managed. For example, the database 103 manages the log data LOG in association with the vehicle ID.

2. Update Verification System

Figure 3:
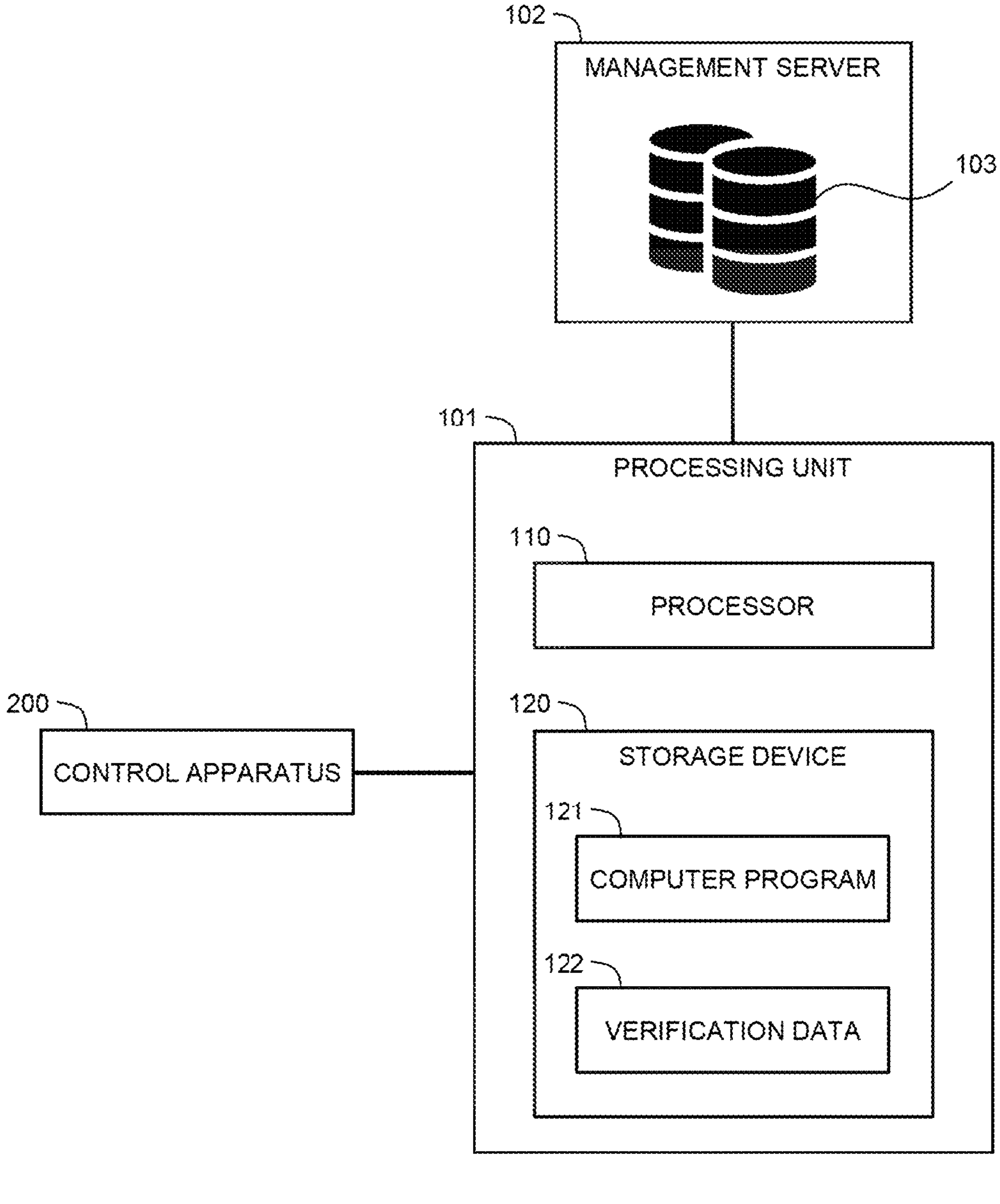
FIG. 3 is a diagram showing a configuration of an update verification system according to the present embodiment.

The update verification method according to the present embodiment is realized by processes executed by a computer. FIG. 3 is a diagram showing an example of a hardware configuration of an update verification system 100 that realizes the update verification method according to the present embodiment.

The update verification system 100 includes a processing unit 101 and the management server 102.

The processing unit 101 is a computer including one or more processors 110 (hereinafter, simply referred to as a processor 110 or processing circuitry) and one or more storage devices 120 (hereinafter, simply referred to as a storage device 120). The processing unit 101 is configured to be able to communicate with the management server 102 and the control apparatus 200. In particular, the processor 110 is configured to communicate with the management server 102 to access the database 103. The processing unit 101 may be a computer mounted on the vehicle 1 or may be a computer outside the vehicle 1 configured to be able to communicate with the vehicle 1.

The processor 110 executes various processes. In particular, the processor 110 executes a process of verifying the update of the control apparatus 200 (hereinafter referred to as an "update verification process"). Details of the update verification process will be described later. The processor 110 can be configured by, for example, a central processing unit (CPU) including an arithmetic device, a register, and the like. The storage device 120 stores various kinds of information necessary for the processor 110 to execute processing. The storage device 120 may be configured by a recording medium such as a read only memory (ROM), a random-access memory (RAM), a hard disk drive (HDD), or a solid-state drive (SSD).

The storage device 120 stores a computer program 121 and verification data 122.

The computer program 121 is executed by the processor 110. Various processing by the processing unit 101 may be realized through cooperation between the processor 110 that executes the computer program 121 and the storage device 120. The computer program 121 may be recorded in a computer-readable recording medium.

The verification data 122 is data used in the update verification process. As will be described later, examples of the verification data 122 include the log data LOG acquired from the control apparatus 200 and the log data LOG acquired from the management server 102.

3. Update Verification Method

Figure 4:
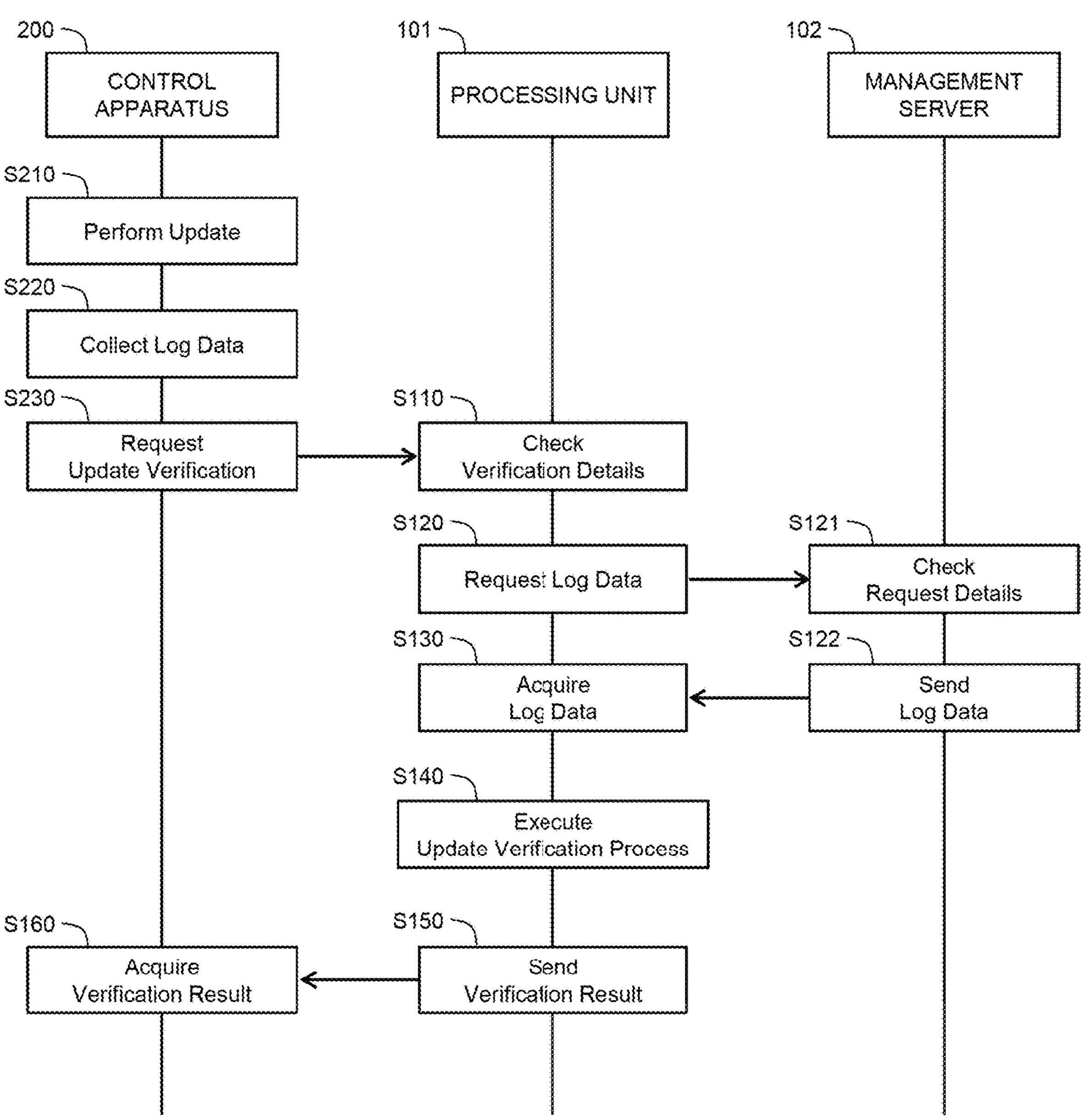
FIG. 4 is a diagram for explaining an update verification method according to the present embodiment.

Hereinafter, the update verification method realized by the update verification system 100 described above will be described. FIG. 4 is a diagram for explaining the update verification method according to the present embodiment.

In FIG. 4, first, an update of the control apparatus 200 is performed (S210). Here, the update of the control apparatus 200 includes upgrade of the machine learning model.

After the update is performed, the control apparatus 200 collects the log data LOG (S220). The collected log data LOG includes the inference result by the machine learning model after the upgrade.

Next, the control apparatus 200 sends a verification request for requesting verification of the update to the processing unit 101 (S230). The verification request may include the ID information of the vehicle 1 and the version information of the machine learning model before and after the update. Further, the control apparatus 200 may be configured to send the log data LOG collected during a predetermined period or a predetermined distance after the update is performed, together with the verification request.

When the processor 110 of the processing unit 101 receives the verification request from the control apparatus 200, the processor 110 checks the requested verification details (S110). For example, the processor 110 checks the ID of the vehicle 1 in which the control apparatus 200 to be verified is mounted, and checks the versions of the machine learning model before and after the update.

Next, the processor 110 requests log data from the management server 102 according to the checked verification details (S120).

In particular, in step S120, the processor 110 requests log data (hereinafter, also referred to as "first log data") collected in the control apparatus to be verified, the first log data is log data regarding the inference result during a predetermined period (or a predetermined distance) by the machine learning model after the upgrade. For example, the processor 110 may request log data to specify an ID of the vehicle 1 in which the control apparatus 200 to be verified is mounted, a version of the machine learning model after the update, and a period (or a distance). However, the processor 110 may be configured to acquire the first log data directly from the control apparatus 200 to be verified.

Further, in step S120, the processor 110 requests log data (hereinafter, also referred to as "second log data") regarding the inference result during a predetermined period (or a predetermined distance) by the machine learning model before the upgrade. For example, the processor 110 request log data to specify a version and a period (or distance) of the machine learning model before the upgrade. The second log data may not be the log data collected in the control apparatus 200 to be verified. That is, the second log data may be log data uploaded from another vehicle 1 to the management server 102. The processor 110 may be configured to request a plurality of pieces of the second log data by specifying a plurality of periods (or distances) or specifying a plurality of other vehicles 1.

When the management server 102 receives the request for the log data from the processing unit 101, the management server 300 checks the request details (S121) and sends the corresponding log data to the processing unit 101 (S122).

The processor 110 of the processing unit 101 acquires the log data from the management server 102 (S130). The processor 110 stores the acquired first log data and the second log data in the storage device 120 as the verification data 122. Thereafter, the processor 110 executes the update verification process based on the first log data and the second log data (S140).

Figure 5:
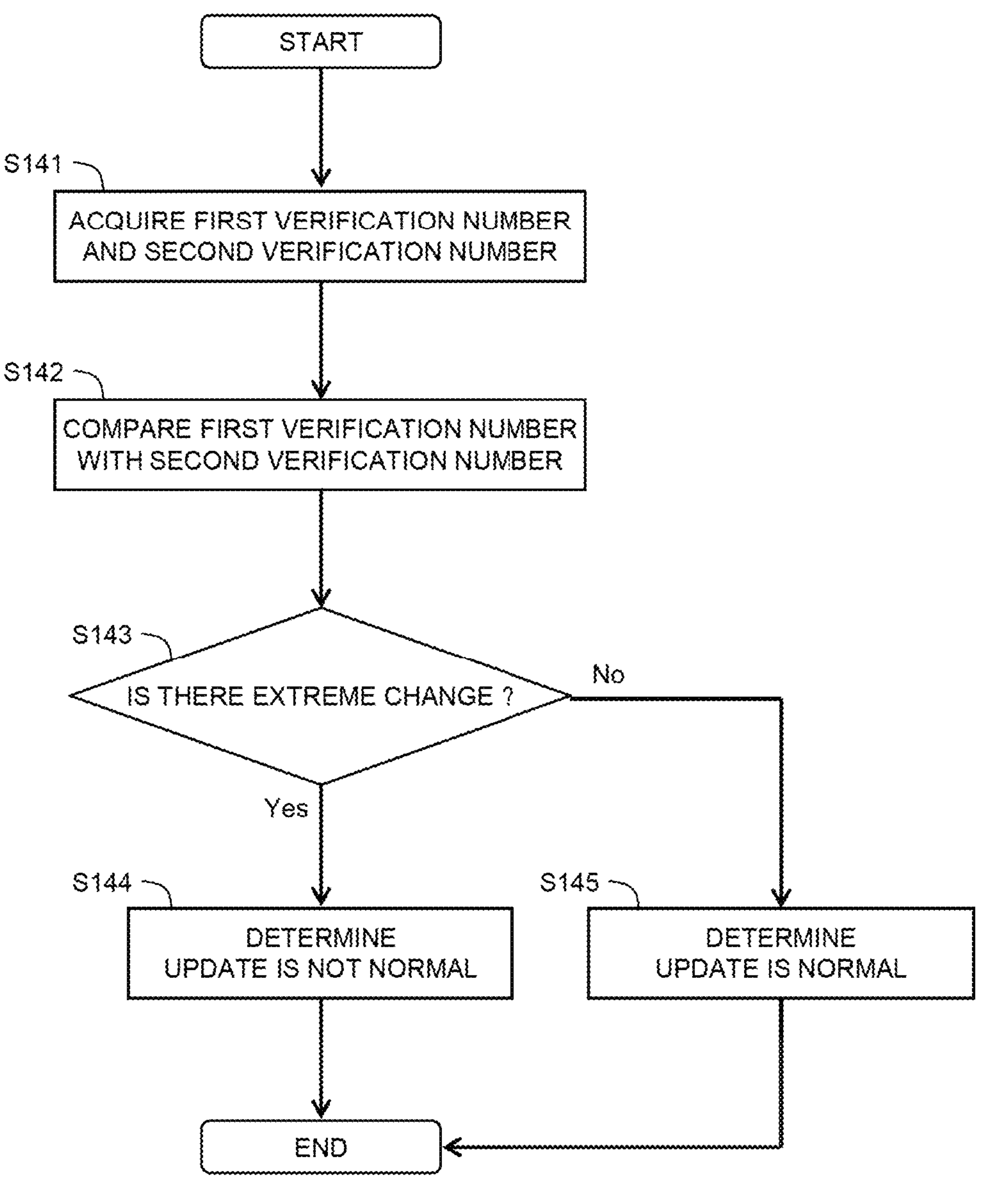
FIG. 5 is a flowchart showing processes executed by a processor according to the present embodiment.

FIG. 5 is a flowchart showing processes executed by the processor 110 in the update verification process.

In step S141, the processor 110 acquires a first verification number and a second verification number from the first log data and the second log data, respectively. When the machine learning model recognizes the situation around the vehicle 1, the first verification number is the number of objects around the vehicle 1 recognized by the machine learning model in the first log data (for example, the number of bounding boxes surrounding the objects recognized on the image). And the second verification number is the number of objects around the vehicle 1 recognized by the machine learning model in the second log data. When the machine learning model generates the travel plan, the first verification number and the second verification number may be the number of driving decisions in the travel plan generated by the machine learning model in the first log data and the second log data, respectively. When a plurality of pieces of the second log data is acquired, the processor 110 may acquire the second verification number for each of the plurality of pieces of the second log data.

Next, in step S142, the processor 110 compares the first verification number with the second verification number.

The number of objects around the vehicle 1 recognized by the machine learning model and the number of driving decisions in the travel plan generated by the machine learning model are one of the indexes showing the performance of the inference result by the machine learning model. In particular, in the case that the update is normal, it is considered that these numbers do not change extremely before and after the update. Considering that the machine learning model before the upgrade may have been already fully operated, if these numbers have changed significantly before and after the update, the machine learning model after the upgrade may not function well.

For example, in a case where both the first verification number and the second verification number show the number of recognized objects around the vehicle 1, when the first verification number is extremely larger than the second verification number, there is a possibility that the number of erroneous detections is rapidly increasing. On the other hand, when the first verification number is extremely smaller than the second verification number, the number of undetected cases may be rapidly increasing. Similarly, in a case where both the first verification number and the second verification number show the number of driving decisions in the generated travel plan, when the first verification number is extremely changed with respect to the second verification number, there is a possibility that the number of erroneous or incomplete decisions is rapidly increasing.

As described above, by comparing the first verification number with the second verification number, it is possible to verify whether the update is normal. In particular, the first verification number and the second verification number can be acquired from log data collected during the execution of the automated driving control of the vehicle 1. That is, according to the present embodiment, the update of the control apparatus 200 can be verified without requiring special verification or additional verification. It is thus possible to identify at an early stage that the update is not normal.

When the first verification number is extremely changed with respect to the second verification number (S143; Yes), the processor 110 determines that the update is not normal (S144), and the process is ended. On the other hand, when the first verification number is not extremely changed with respect to the second verification number (S143; No), it is determined that the update is normal (S145), and the process is ended.

As described above, the processor 110 executes the update verification process. In the update verification process, the comparison between the first verification number and the second verification number can be performed as follows, for example.

Figure 6A:
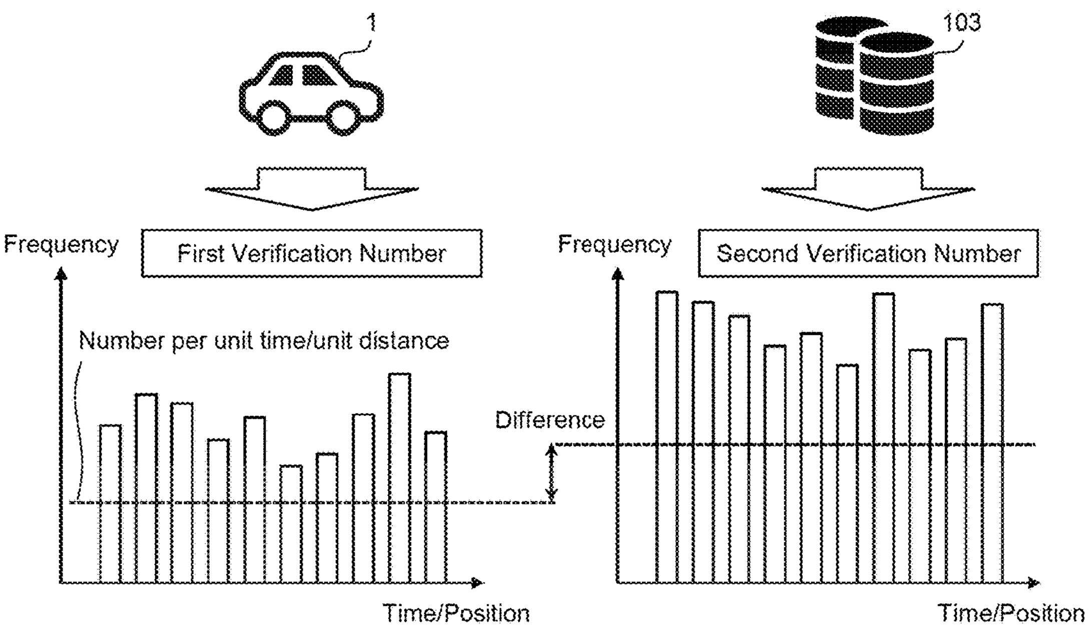
FIG. 6A is a diagram for explaining comparison between a first verification number and a second verification number.

One is to check the magnitude of the difference between the number per unit time (or unit distance) of the first verification number and the number per unit time (or unit distance) of the second verification number. FIG. 6A is a conceptual diagram showing an example of a case where the first verification number and the second verification number are compared by checking the magnitude of the difference. In FIG. 6A, the number per unit time (or unit distance) of the first verification number and the number per unit time (or unit distance) of second verification number are illustrated by broken lines, respectively. In this case, the processor 110 may determine that the update is not normal when the magnitude of the difference exceeds a predetermined threshold.

Figure 6B:
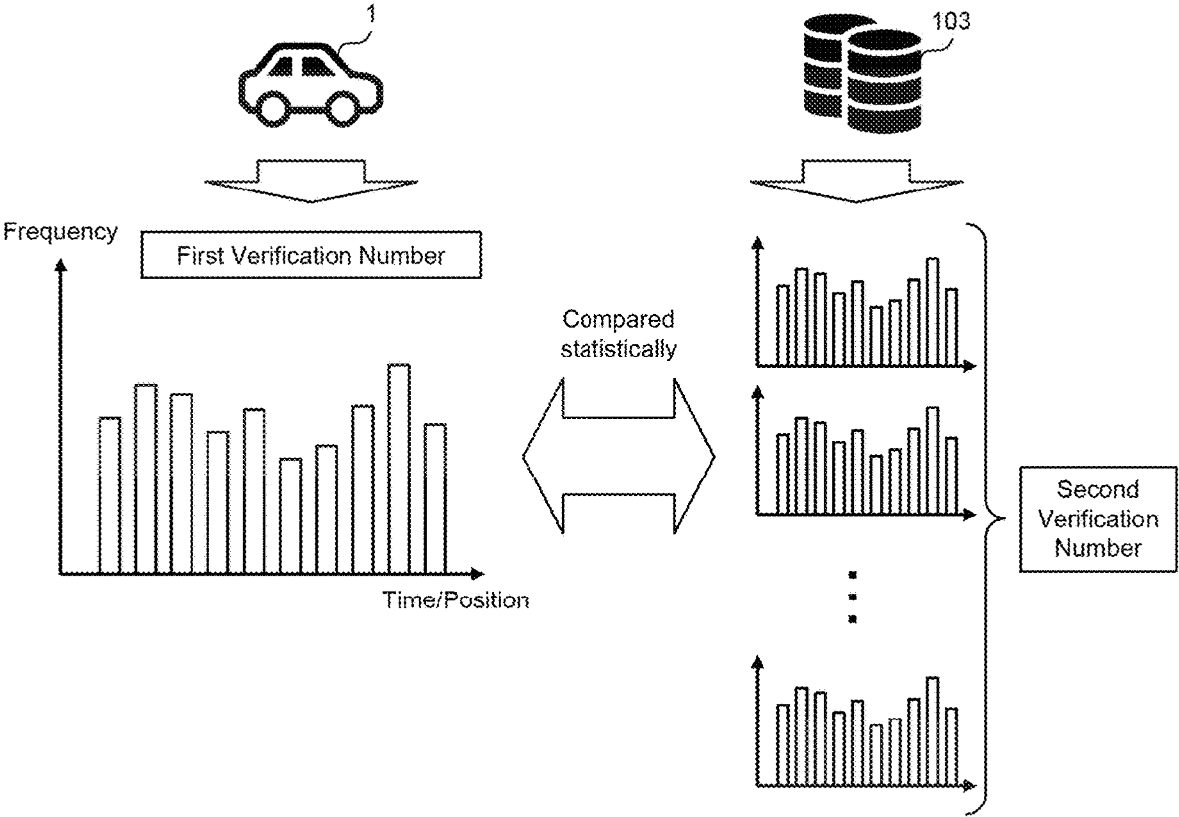
FIG. 6B is a diagram for explaining comparison between the first verification number and the second verification number.

The other is, when the plurality of pieces of the second verification number is acquired, to perform comparison based on statistical data obtained from the plurality of pieces of the second verification number. FIG. 6B is a conceptual diagram showing an example of a case where the first verification number and the second verification number are compared based on statistical data obtained from a plurality of pieces of the second verification number. In this case, the processor 110 may calculate a statistical model with respect to the number of objects around the vehicle 1 recognized by the machine learning model or the number of driving decisions in the travel plan generated by the machine learning model based on the plurality of pieces of the second verification number, and may determine that the update is not normal when it is determined that the first verification number has a significant difference with respect to the calculated statistical model.

Refer to FIG. 4 again. After executing the update verification process, the processor 110 of the processing unit 101 sends the verification result to the control apparatus 200 (S150). The control apparatus 200 acquires the verification result from the processing unit 101 (S160).

The control apparatus 200 may be configured to execute processing in accordance with the acquired verification result. For example, the control apparatus 200 may be configured to roll back before the update when acquiring the verification result showing that the update is not normal.

As described above, the update verification system and the update verification method according to the present embodiment are realized. As described above, the update verification program according to the present embodiment is realized by the computer program 121 that causes the processor 110 to execute the processes.

What is claimed is:

1. An update verification method for verifying, by a computer, an update of a control apparatus that performs automated driving control of a vehicle by using a machine learning model, wherein the computer is configured to be able to access one or more storage devices that store log data regarding an inference result by the machine learning model, the update includes upgrade of the machine learning model, the machine learning model is configured to perform at least one of recognizing a surrounding situation of the vehicle or generating a travel plan for the automated driving control, and the update verification method includes that the computer executes:

acquiring a first verification number, the first verification number being either a number of objects around the vehicle recognized during a predetermined period or a predetermined distance by the machine learning model after the upgrade, or a number of driving decisions in the travel plan generated during the predetermined period or the predetermined distance by the machine learning model after the upgrade;

acquiring a second verification number with reference to the log data, the second verification number being either a number of objects around the vehicle recognized during the predetermined period or the predetermined distance by the machine learning model before the upgrade, or a number of driving decisions in the travel plan generated during the predetermined period or the predetermined distance by the machine learning model before the upgrade; and verifying whether the update is normal by comparing the first verification number with the second verification number.

2. The update verification method according to claim 1, wherein the verifying whether the update is normal includes determining that the update is not normal when a magnitude of a difference between a number per unit time or unit distance of the first verification number and a number per unit time or unit distance of the second verification number exceeds a predetermined threshold.

3. An update verification system for verifying an update of a control apparatus that performs automated driving control of a vehicle by using a machine learning model, the update verification system comprising:

processing circuitry; and one or more storage devices storing log data regarding an inference result by the machine learning model, wherein the update includes upgrade of the machine learning model, the machine learning model is configured to perform at least one of recognizing a surrounding situation of the vehicle or generating a travel plan for the automated driving control, and the processing circuitry is configured to execute:

acquiring a first verification number, the first verification number being either a number of objects around the vehicle recognized during a predetermined period or a predetermined distance by the machine learning model after the upgrade, or a number of driving decisions in the travel plan generated during the predetermined period or the predetermined distance by the machine learning model after the upgrade;

acquiring a second verification number with reference to the log data, the second verification number being either a number of objects around the vehicle recognized during the predetermined period or the predetermined distance by the machine learning model before the upgrade, or a number of driving decisions in the travel plan generated during the predetermined period or the predetermined distance by the machine learning model before the upgrade; and verifying whether the update is normal by comparing the first verification number with the second verification number.

4. A non-transitory computer readable recording medium on which a computer program for causing a computer to execute verifying an update of a control apparatus that performs automated driving control of a vehicle by using a machine learning model is recorded, wherein the computer is configured to be able to access one or more storage devices that store log data regarding an inference result by the machine learning model, the update includes upgrade of the machine learning model, the machine learning model is configured to perform at least one of recognizing a surrounding situation of the vehicle or generating a travel plan for the automated driving control, and the computer program, when executed by the computer, causes the computer to execute:

acquiring a first verification number, the first verification number being either a number of objects around the vehicle recognized during a predetermined period or a predetermined distance by the machine learning model after the upgrade, or a number of driving decisions in the travel plan generated during the predetermined period or the predetermined distance by the machine learning model after the upgrade;

acquiring a second verification number with reference to the log data, the second verification number being either a number of objects around the vehicle recognized during the predetermined period or the predetermined distance by the machine learning model before the upgrade, or a number of driving decisions in the travel plan generated during the predetermined period or the predetermined distance by the machine learning model before the upgrade; and verifying whether the update is normal by comparing the first verification number with the second verification number.

* * * * *